United States Patent
Tieu

(10) Patent No.: US 8,026,680 B2
(45) Date of Patent: Sep. 27, 2011

(54) METHODS AND APPARATUS TO REDUCE THE STOPPING TIME OF SPINDLE MOTORS

(75) Inventor: Triet Tieu, Frisco, TX (US)

(73) Assignee: Texas Instruments Incorporated, Dallas, TX (US)

( * ) Notice: Subject to any disclaimer, the term of this patent is extended or adjusted under 35 U.S.C. 154(b) by 460 days.

(21) Appl. No.: 12/059,131

(22) Filed: Mar. 31, 2008

(65) Prior Publication Data

US 2009/0243521 A1    Oct. 1, 2009

(51) Int. Cl.
*H02P 3/06*    (2006.01)
(52) U.S. Cl. ......... 318/367; 318/366; 318/364; 318/362
(58) Field of Classification Search .................. 318/367, 318/364, 366, 362
See application file for complete search history.

(56) References Cited

U.S. PATENT DOCUMENTS

| 4,386,305 | A | * | 5/1983 | Kohzai et al. ................. 318/571 |
| 4,549,120 | A | * | 10/1985 | Banno et al. ............... 318/400.1 |
| 5,982,119 | A | * | 11/1999 | Okada et al. .................. 318/286 |
| 6,574,062 | B1 | * | 6/2003 | Bennett et al. .................. 360/69 |
| 6,598,000 | B1 | * | 7/2003 | Menegoli et al. ............... 702/65 |
| 6,906,485 | B2 | * | 6/2005 | Hussein ................... 318/400.28 |
| 7,385,886 | B2 | * | 6/2008 | Yang ......................... 369/44.25 |

* cited by examiner

*Primary Examiner* — Walter Benson
*Assistant Examiner* — David S Luo
(74) *Attorney, Agent, or Firm* — Dawn V. Stephens; W. James Brady; Frederick J. Telecky, Jr.

(57) ABSTRACT

Methods and apparatus to reduce the stopping time of a spindle motor are disclosed. An example method includes detecting a dissipation current flowing in a spinning motor; determining when the dissipation current drops below a threshold value; and, in response to the dissipation current dropping below the threshold value, applying a voltage to the motor to increase the dissipation current for a duration. In some examples, the voltage is removed from the motor when the motor reaches a predetermined rotational velocity to avoid reverse rotation.

18 Claims, 6 Drawing Sheets

METHODS AND APPARATUS TO REDUCE THE STOPPING TIME OF SPINDLE MOTORS

FIELD OF THE DISCLOSURE

This disclosure relates generally to motor control and, more particularly, to methods and apparatus to reduce the stopping time of spindle motors.

BACKGROUND

A hard disk drive is a non-volatile storage device that stores encoded data on one or more rotatable storage platters. To read and write data to and from the platters, the hard disk drive includes read and write heads coupled to one or more actuator arms that move radially across the platters. A spindle motor is used to rotate the platters and is typically driven by a motor controller. The controller also typically stops the rotation of the spindle when the hard disk drive enters an inactive state.

DETAILED DESCRIPTION

Figure 1:
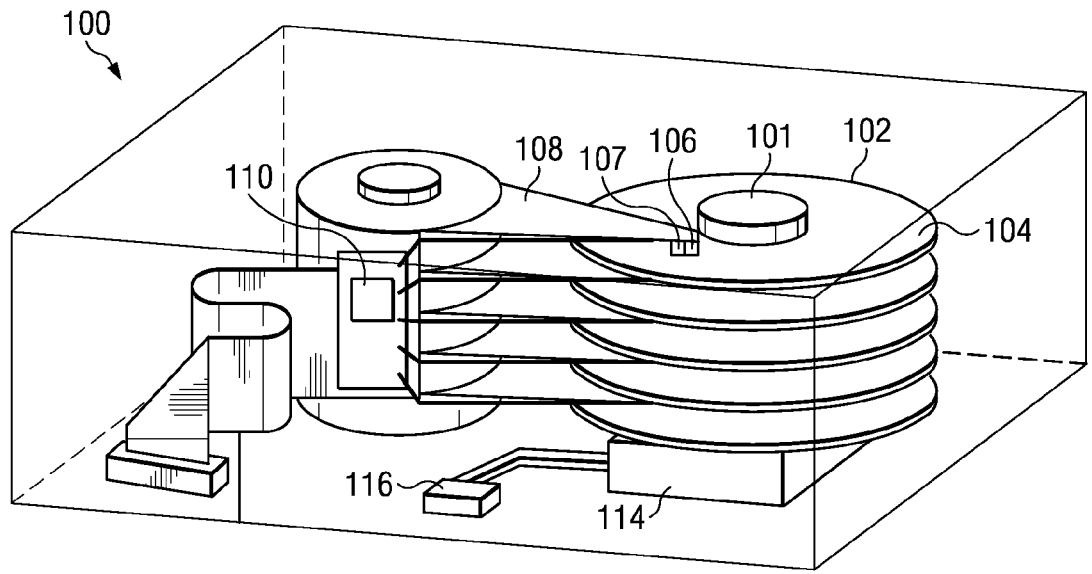
FIG. 1 is an illustration of an example hard disk drive including a motor control system.

FIG. 1 is an illustration of an example hard disk drive (HDD) 100. The HDD 100 includes a spindle 101 that holds at least one platter 102 having a magnetic surface 104. As shown in FIG. 1, the HDD 100 includes a plurality of platters. However, for purposes of clarity, only the top platter 102 is described herein. The remaining platters shown in FIG. 1 operate in a similar manner as the top platter 102.

The platter 102 spins such that a write head 106 can write data to the platter 102 and a read head 107 can read data from the platter 102. In the illustrated example, the write head 106 is implemented separately from the read head 107. Alternatively, the write and read heads 106 and 107 may be implemented in a single head assembly. To write data onto the platter 102, a portion of the magnetic surface 104 is magnetized via the magnetic write head 106. The read head 107, which is magneto-resistive, then detects the magnetic characteristics of the magnetized portion. The write head 106 and the read head 107 (referred to herein as the heads 106 and 107) are coupled to an actuator arm 108 that moves radially across the platter 102. To control a read and/or write operation, a hard drive read/write system 110 is coupled to the heads 106 and 107.

To provide access to the entire magnetic surface 104, the platter 102 rotates. A spindle motor 114 drives the rotation of the platter 102 and is operated by a motor control system 116. The motor 114 of the illustrated example is a three-phase, direct current (DC) brushless spindle motor. The motor control system 116 causes the motor 114 to be operated in one of a plurality of modes including, for example, a run mode or a coast mode. As described in greater detail below in connection with FIG. 2, the motor 114 receives control signals from the motor control system 116 that drive the individual phases of the motor 114 to cause a rotation of the motor 114 or to stop a rotation of the motor 114. While the motor control system 116 is illustrated as part of the HDD 100, the motor control system 116 may be implemented in any suitable location within or coupled to the HDD 100. For example, the motor control system 116 may be implemented using a processor (e.g., the processor platform 600 of FIG. 6) in electronic communication with the motor 114 and/or, more generally, the HDD 100. Alternatively, the motor control system 116 may be implemented as part of the hard drive read/write system 110.

The motor 114 spins the platter 102 by way of the spindle 101 at a substantially constant speed (e.g., 10,000 revolutions per minute (rpm), 7,200 rpm, or 5,400 rpm) in a forward direction during a read or write operation (e.g., during a run mode). When the HDD 100 receives a signal to stop the rotation of the spindle 101, the motor control system 116 causes the motor 114 to undergo a braking operation to bring the spindle 101 to a rest. Generally, it is preferable for the braking operation to have a short duration due, in part, to the close proximity of the heads 106 and 107 to the surface 104 of the platter 102. In particular, the heads 106 and 107 may drag along the surface 104 during the braking operation. The surface 104 may have small textured bumps to reduce stiction in a landing zone (e.g., a segment of the surface 104 at which the heads 106 and 107 rest on the surface 104). Contact between the heads 106 and 107 and the surface 104 causes particles (e.g., coating particles) to loosen from the surface 104, leading to defects and reduced reliability. At lower speeds of rotation, the friction between the surface 104 and the heads 106 and 107 increases. In other words, the longer the spindle rotates during the braking operation, the more the heads 106 and 107 drag on the surface 104. This problem is more severe in heavy mass disk drives because more inertia results in a longer braking operation. Although described herein as a braking operation, the motor 114 of the illustrated example is brought to a stop without the use of a mechanical brake.

One conventional method of stopping a multiple phase motor involves shorting together all phases that drive the rotation of the motor, thereby causing the motor to annularly decelerate. Generally, as the motor slows down after being shorted, the kinetic energy built up from the spinning of the motor is converted to heat, which is dissipated in the total resistance of the motor and any related electronic components (e.g., the field effect transistors 216-226 of FIG. 2). Thus, the duration of such a braking operation is a function of energy conversion from kinetic energy to heat energy.

As described in greater detail below in connection with FIGS. 3A-3C and Equations 1-3, the duration of the braking operation of the example motor 114 of FIG. 1 depends on the amount of dissipation current flowing through the motor 114 (e.g., when the motor 114 is not driving the rotation of the spindle 101). Specifically, a larger amount of dissipation current flowing through the motor 114 causes the rotation of the motor 114 to end sooner (e.g., the kinetic energy of the spinning motor 114 is drained faster as current is converted to heat).

As described herein, the example motor control system 116 is capable of reducing the duration of the braking operation by increasing the dissipation current. In particular, the motor control system 116 implements an active brake operation wherein a power source (e.g., the power source 230 of FIG. 2) is used to apply a voltage to the motor 114 in response to a decrease in dissipation current. The applied voltage has an inverse polarity of the back electromotive force (BEMF) generated by the motor 114 and is controlled by the motor control system 116. When the motor 114 has come to a stop, the voltage is removed by the motor control system 116.

Figure 2:
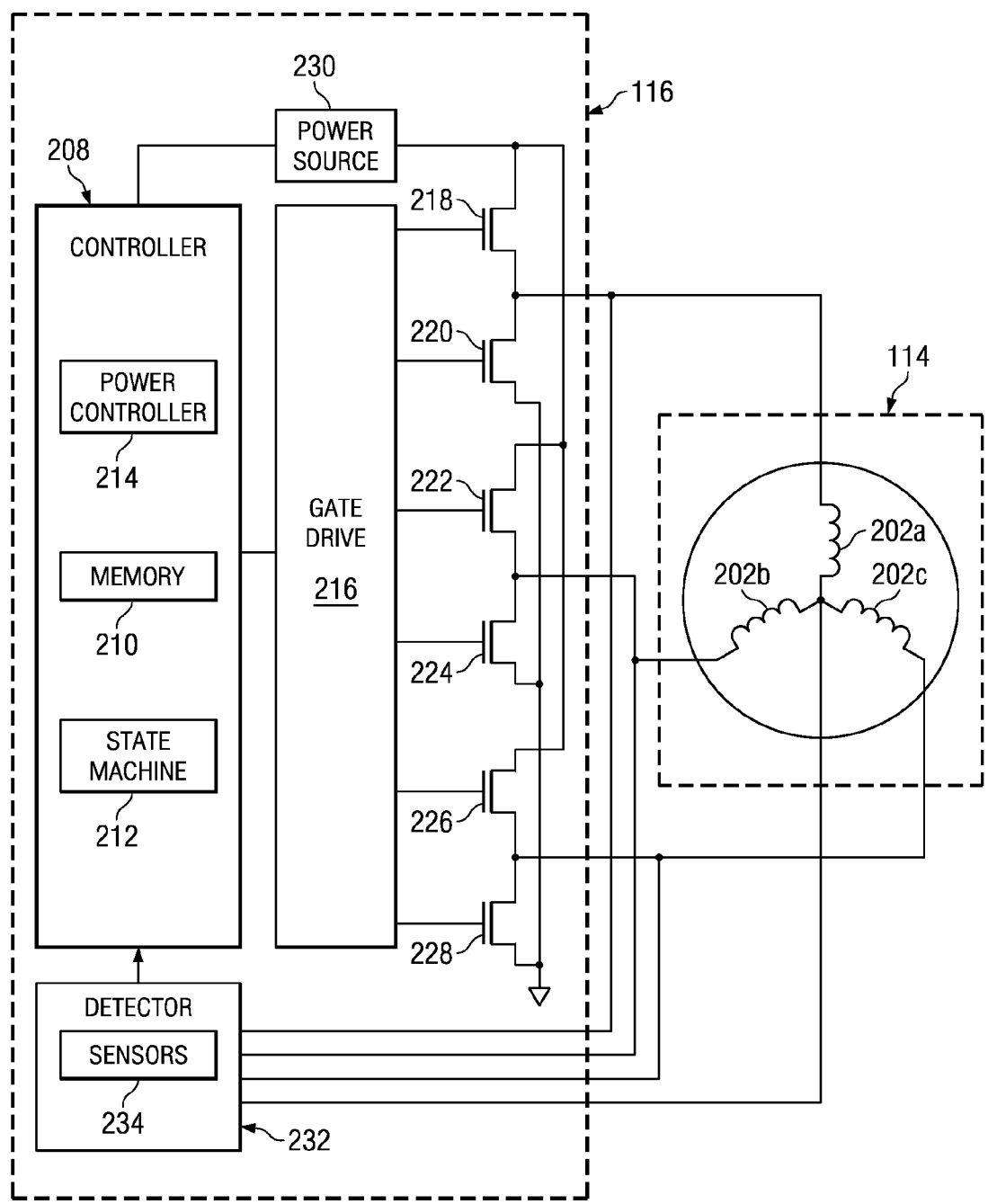
FIG. 2 is a block diagram of an example implementation of the example motor control system and the example motor of FIG. 1.

FIG. 2 is a block diagram of an example implementation of the example motor 114 and the example motor control system 116 of FIG. 1. In the illustrated example, the motor 114 is a three-phase direct current spindle motor. Accordingly, the motor 114 includes three windings 202a-c (corresponding to the three phases of the motor 114) that interact with a rotor (not shown) to rotate the motor 114. Generally, the motor 114 is rotated by supplying current to the windings 202a-c according to a sequence including six-commutation states. Each commutation state corresponds to a direction or configuration of current flow among the windings 202a-c. As the motor 114 progresses through the sequence of commutation states, the spindle 101 rotates based on the electromagnetic interaction between the windings 202a-c and permanent magnets in the rotor 204. Other example implementations may include an alternative number of phase(s), winding(s), commutation state(s), and/or rotor(s).

Progression through the commutation states and, thus, the rotation of the motor 114 (e.g., a speed of rotation, a signal to begin rotating, a signal to stop rotating, etc.) is controlled by a controller 208. The example controller 208 of FIG. 2 includes memory 210, a state machine 212, and a power controller 214. The memory 210 includes a plurality of instructions (e.g., the machine readable instructions implementing the active brake process 400 of FIG. 4) to operate the motor 114. Further, the example controller 208 of FIG. 2 may include additional components and/or modules (e.g., digital to analog converter(s) (DACs), analog to digital converter(s) (ADCs), buffer(s), clock module(s), servo(s), driver(s), interface(s), sensor(s), etc.) that are not shown in FIG. 2 for purposes of clarity. Of course, the implementation of the active brake process 400 of FIG. 4 may be carried out using any form of logic, such as digital logic, programmable logic, etc.

To efficiently drive the motor 114 (e.g., to maximize torque) and to minimize mechanical vibration, the state machine 212 causes the motor 114 to progress through the commutation states in a certain sequence and at a certain rate (e.g., as dictated by a clock (not shown)). The state machine 212 of the illustrated example receives a control signal from the controller 208 that causes the motor 114 to be in one of a plurality of operational modes (e.g., a coast mode, a run mode, or in any other mode). The controller 208 and/or, more specifically, the state machine 212 then outputs one or more signals that cause a gate drive 216 to deliver energy to particular windings of the motor 114 according to the current operational mode and the corresponding commutation state(s). For example, in an example run mode, commutation state 1 of the state machine 212 will force current to flow into the first winding 202a and out of the second winding 202b, while no current flows through the third winding 202c. Commutation state 2 of the state machine 212 will force current to flow into the second winding 202b and out of the third winding 202c, while no current flows through the first winding 202a. In an example coast mode, the state machine 212 outputs a commutation state in which the gate drive 214 does not drive the motor 114 (e.g., the windings 202a-c do not receive current).

The gate drive 216 of the illustrated example receives the signals from the controller 208 and controls the current flow to the motor 114 according to the received signals. Specifically, the gate drive 214 is coupled to and operates a plurality of field effect transistors (FETs) 218-228. The FETs 218-228 act as switches that selectively deliver power from a power source 230 to the windings 202a-c of the motor 114. The FETs 218-228 of the illustrated example are metal oxide semiconductor field effect transistors (MOSFETs). However, any type of transistor or controllable switch may be used to control the application of the power source 230 to the motor 114.

In the illustrated example of FIG. 2, the drain of a first FET 218 is coupled to the power source 230 and the source of the first FET 218 is coupled to the first winding 202a. The drain of a second FET 220 is coupled to the first winding 202a and the source of the second FET 220 is coupled to ground 206. The drain of a third FET 222 is coupled to the power source 230 and the source of the third FET 222 is coupled to the second winding 202b. The drain of a fourth FET 224 is coupled to the second winding 202b and the source of the fourth FET 224 is coupled to ground 206. The drain of a fifth FET 226 is coupled to the power source 230 and the source of the fifth FET 226 is coupled to the third winding 202c. The drain of a sixth FET 228 is coupled to the third winding 202c and the source of the sixth FET 228 is coupled to ground 206.

As an illustration, when the state machine 212 is in commutation state 1, as described above, current flows from the first winding 202a, then to the second winding 202b, and then to ground 206. Thus, the gate drive 216 will generate signals to cause the first FET 218 and the fourth FET 224 to conduct current. The gate drive 216 will also generate signals to cause the second FET 220, the third FET 222, the fifth FET 226 and the sixth FET 228 to be off (e.g., not to conduct current). In a coast mode (e.g., a mode in which the motor is spinning but not being powered), the gate drive 216 will generate signals to cause the FETs 118-228 to be off (e.g., in tri-state), thereby increasing the impedance and, thus, blocking current from the windings 202a-c. These commutation states are for illustrative purposes and to implement other commutation states, the operations of the FETs are changed accordingly depending on the desired commutation state.

To detect, inter alia, switching points between commutation states, current commutation states, and/or, more generally, a status of the motor 114, a detector 232 receives a plurality of signals from the motor 114. Specifically, the detector 232 receives current signals from each of the windings 202a-c and a center tap of the motor 114. In the illustrated example of FIG. 2, these signals are conveyed to one or more sensors 234 (e.g., sense transistors or resistors) to determine a status of the motor 114. For example, when the sensors are resistors, a voltage is read from the sensors, which is then conveyed to the controller 208.

To drive the motor 114 in a run mode (e.g., during a read/write operation), the power source 230 applies a voltage (as controlled by the gate drive 216 and the FETs 218-228) to the windings 202a-c. The resulting current flowing through the windings 202a-c causes an electromagnetic response in the rotor, thereby rotating the spindle 101. To control the application of the voltage and, thus, the current delivered to the windings 202a-c, the power source 230 is coupled to the controller 208, which includes the power controller 214. In the illustrated example, the power controller 214 determines a polarity and a magnitude of the voltage output by the power source 230. These values are set according to one or more parameters of the HDD 100, such as the size of the motor 114, the number of platters, the mass of the platters, an inertia associated with the platters, the number of phases or poles, etc. The magnitude may be adjusted by, for example, adjusting the settings of one or more control elements, such as a digital-to-analog converter (DAC).

The power source 230 is capable of applying voltages of different polarities (e.g., positive voltages and negative voltages) to the windings 202a-c. For example, the power controller 214 causes the power source 230 to apply a positive voltage to the windings 202a-c during a run mode (e.g., during a read/write operation) to rotated the motor 114 in a forward direction. As described in greater detail below, during an active brake operation (e.g., the example active brake process 400 described below in connection with FIG. 4), when the power controller 214 determines that dissipation current is too low, the power controller 214 causes the power source 230 to apply a negative voltage to the windings 202a-c for a duration of time. The dissipation current refers to the current flow caused by the BEMF and dissipated to heat over the resistance of the motor 114 and any related control elements (e.g., the FETs 218-228). In the illustrated example, when the motor 114 comes to a stop or is relatively close to coming to a stop, the controller 208 ends the active brake operation by shorting together all three phases (e.g., via firmware of the controller 208). This ensures the motor comes to a complete halt and that the motor is never driven in a reverse direction.

The negative voltage applied during the active brake operation boosts the dissipation current and, thus, decreases the time taken to stop the rotation of the motor (e.g., by accelerating the conversion of kinetic energy to dissipated heat). To further illustrate the example active brake operation described herein (e.g., the example active brake process 400 of FIG. 4), FIGS. 3A-C show circuit representations 300, 302, and 304 of the example motor 114 of FIG. 2. The circuit representations 300, 302, and 304 include a power source ($V_{PS}$) 306 representative of the power source 230 of FIG. 2, a FET resistance ($R_{FET}$) 308 representative of the total resistance of the FETs 218-228 of FIG. 2, a motor resistance ($R_M$) 310 representative of the resistance of the motor 114, a motor inductance ($L_M$) 312 representative of the total inductance of the windings 202a-c, and a BMEF voltage ($V_{BEMF}$) 314 representative of the BEMF generated by the rotation of the electromagnetic motor 114. As illustrated in FIGS. 3A-C, $V_{PS}$ is shown as 12 volts, $R_{FET}$ is shown as 1 ohm, $R_M$ is shown as 2 ohms, and $V_{BEMF}$ is shown as 7 volts. However, these values are meant for illustrative purposes and other examples may include any other suitable valudes. The BEMF voltage 314 is a potential difference created by the rotation of the motor 114 that opposes the current that induced the BEMF 314 (e.g., the BEMF 314 has an inverse polarity relative to the power source 306). As the motor 114 rotates faster, the BEMF voltage 314 builds up and acts as a voltage generator. Thus, the BEMF 314 is illustrated as a voltage source in the example circuit representations 300, 302, and 304 of FIGS. 3A-C.

Figure 3A:
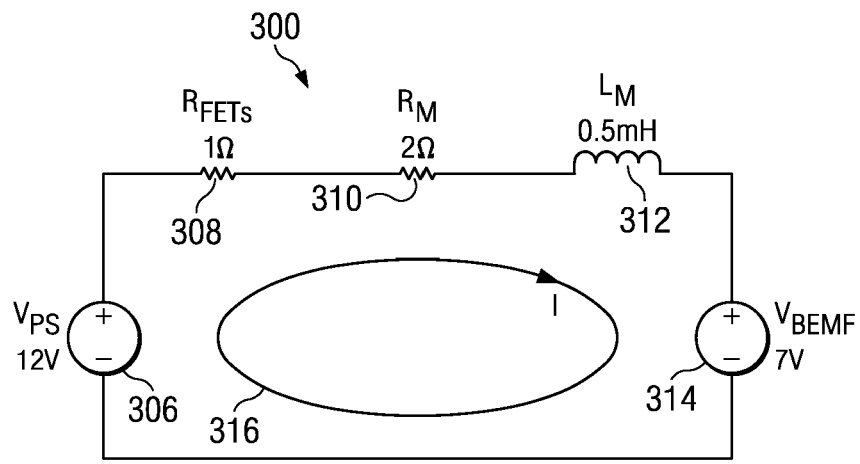
FIGS. 3A-3C are circuit representations of the example motor of FIG. 2 under control of the motor control system of FIG. 2.

FIG. 3A is a circuit representation 300 of the motor 114 in a run mode. In the illustrated example, the power source 306 (e.g., as controlled by the power controller 214, the gate drive 216, and the FETs 218-228) applies a positive voltage causing forward current (I) 316 to flow in the forward direction shown in FIG. 3A. Forward current 316 causes the motor 114 to spin and, thus, build up kinetic energy. As shown by the polarity of the BEMF voltage 314 representation of FIG. 3A, the BEMF voltage 314 naturally opposes the power source 306.

Figure 3B:
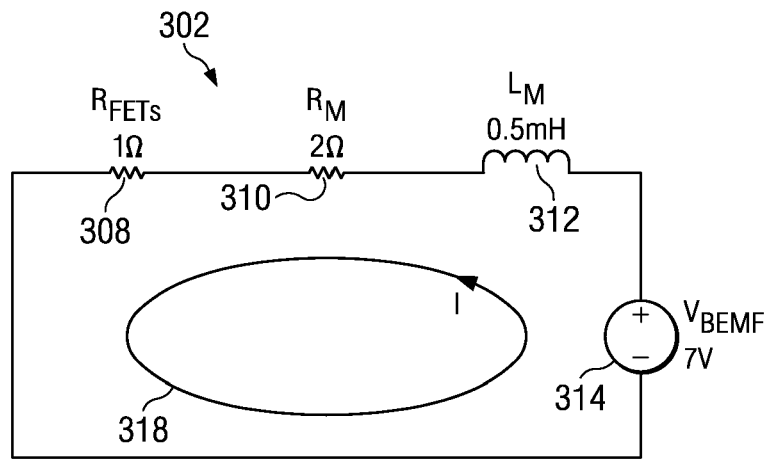

The circuit representation 302 of FIG. 3B represents the motor 114 in a traditional brake mode. At the beginning of the brake mode, the BEMF is at its peak value and, in turn, the dissipation current is high. Thus, slowing the motor 114 by shorting all three phases to ground is efficient at the beginning of the brake mode. For example, at the onset of the active brake operation described herein, the controller 208 causes low-side FETs 220, 224, and 228, via the gate drive 214, to be turned on. The motor 114 drains its energy by dissipating the BEMF via the motor resistance ($R_M$) and the FET resistance ($R_{FET}$). In the absence of power from the power source 306, the BEMF causes the circuit to experience a reverse current 318 flowing in the reverse direction indicated in FIG. 3B. Because the motor 114 was rotating immediately prior to the onset of the braking operation, the motor 114 has stored kinetic energy. Thus, the motor 114 continues to spin in the forward direction. The kinetic energy of the motor 114 can be expressed according to the following equation:

$$KE(t_0) = \frac{1}{2} * m * \text{Velocity}(t_0)^2, \quad [1]$$

where m is the mass of the motor 114 and $t_0$ is the time at which the coast mode was entered (e.g., when the power source 306 no longer delivers current to the motor 114). To bring the motor 114 to a complete stop, the kinetic energy is drained. Specifically, the kinetic energy is dissipated to heat on the motor resistance 308 and the FET resistance 310.

The dissipation of the energy is a integral function of dissipation power, as shown in the following equations:

$$KE(t_0) = \int_{t=t_0}^{t_f} P(t)*dt, \quad [2]$$

where P(t) is the dissipation power at time t and final time $t_f$ is when the motor comes to a complete stop (e.g., where the kinetic energy of the motor 114 is zero ($KE(t_f)=0$)). That is, the dissipation power is the average heat dissipated on the combination of the motor resistance 308 and the FET resistance 310.

Further, the dissipation energy can be expressed in following equation:

$$P(t) \cong *I(t)^2 *(R_M + R_{FET}), \quad [3]$$

where I(t) is the dissipation current flowing through the motor 114 at time t. As shown in FIG. 3B, the dissipation current is driven by the BEMF 314. However, as described in connection with FIG. 3C, the BEMF 314 naturally decreases over time, thereby decreasing the dissipation current.

From these equations, it is evident that a higher current (and thus a larger dissipation power) leads to a faster drain of stored kinetic energy. Thus, the example motor control system 116 causes the power source 230 and the gate drive 216 of FIG. 2 to apply an inverse voltage (relative to the polarity of the voltage applied to drive the rotation of the motor 114 in a forward direction during a read/write operation) to the windings 202a-c, thereby boosting the dissipation current being driven by the BEMF 314.

Figure 3C:
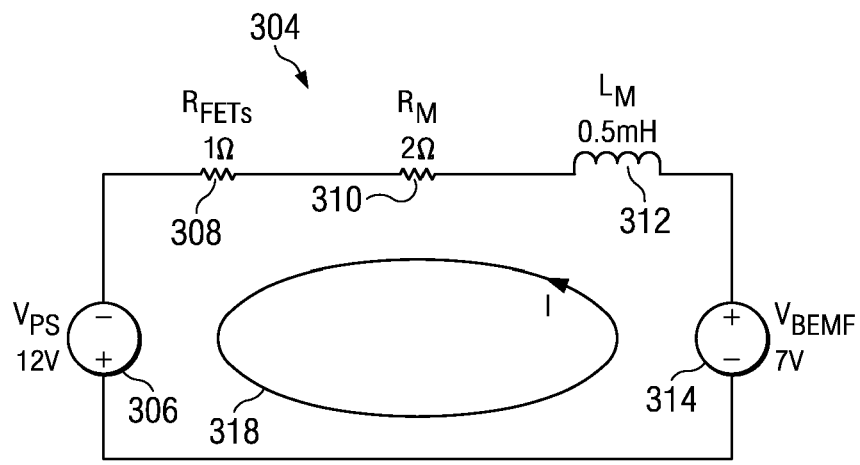

The circuit representation 304 of FIG. 3C represents the motor 114 during the application of the inverse voltage. In particular, the BEMF 314, which was generated by the rotation of the motor 114 in the forward direction (having the polarity shown in FIG. 3A), naturally decreases over time. In the illustrated example, when the BEMF 314 decreases past a predetermined value and, thus, the dissipation current drops below a threshold, the inverse power source 306 is applied to the motor 114. In the illustrated example, this determination and value of the threshold(s) are implemented by the detector 232 of FIG. 2. Alternatively, the inverse power source 306 may be applied in response to a detection of a rotational speed of the motor 114 that is less than a predetermined angular speed. As shown in FIG. 3C, the power source 306 has a polarity opposite to that the power source 306 in FIG. 3A. When most or all of the kinetic energy of the spinning motor 114 is converted to heat, the inverse voltage is removed from the terminals of the motor 114 (e.g., via the FETs 218-228), thereby keeping the motor 114 stopped. That is, in such a state, the BEMF 314 is drained and the windings 202a-c of the motor 114 do not receive current. Thus, the motor 114 remains idle.

While an example manner of implementing the motor 114 and the motor control system 116 of FIG. 1 has been illustrated in FIG. 2, one or more of the elements, processes and/or devices illustrated in FIG. 2 may be combined, divided, rearranged, omitted, eliminated and/or implemented in any other way. Further, the example controller 208, the example memory 210, the example state machine 212, the example power controller 214, the example gate drive 216, the example FETs 218-228, the example power source 230, the example detector 232, the example sensors 234, and/or, more generally, the example motor control system 116 of FIG. 2 may be implemented by hardware, software, firmware and/or any combination of hardware, software and/or firmware. Thus, for example, any of the example controller 208, the example memory 210, the example state machine 212, the example power controller 214, the example gate drive 216, the example FETs 218-228, the example power source 230, the example detector 232, the example detectors 234, and/or, more generally, the example motor control system 116 of FIG. 2, could be implemented by one or more circuit(s), programmable processor(s), application specific integrated circuit(s) (ASIC(s)), programmable logic device(s) (PLD(s)), and/or field programmable logic device(s) (FPLD(s)), etc. When any of the appended claims are read to cover a purely software implementation, at least one of the example controller 208, the example memory 210, the example state machine 212, the example power controller 214, the example gate drive 216, the example FETs 218-228, the example power source 230, the example detector 232, the example sensors 234, and/or, more generally, the example motor control system 116 of FIG. 2 are hereby expressly defined to include a tangible medium such as a memory, DVD, CD, etc. Further still, the example motor control system 116 and/or the example motor 114 of FIG. 1 may include one or more elements, processes and/or devices in addition to, or instead of, those illustrated in FIG. 2, and/or may include more than one of any or all of the illustrated elements, processes and devices.

Figure 4:
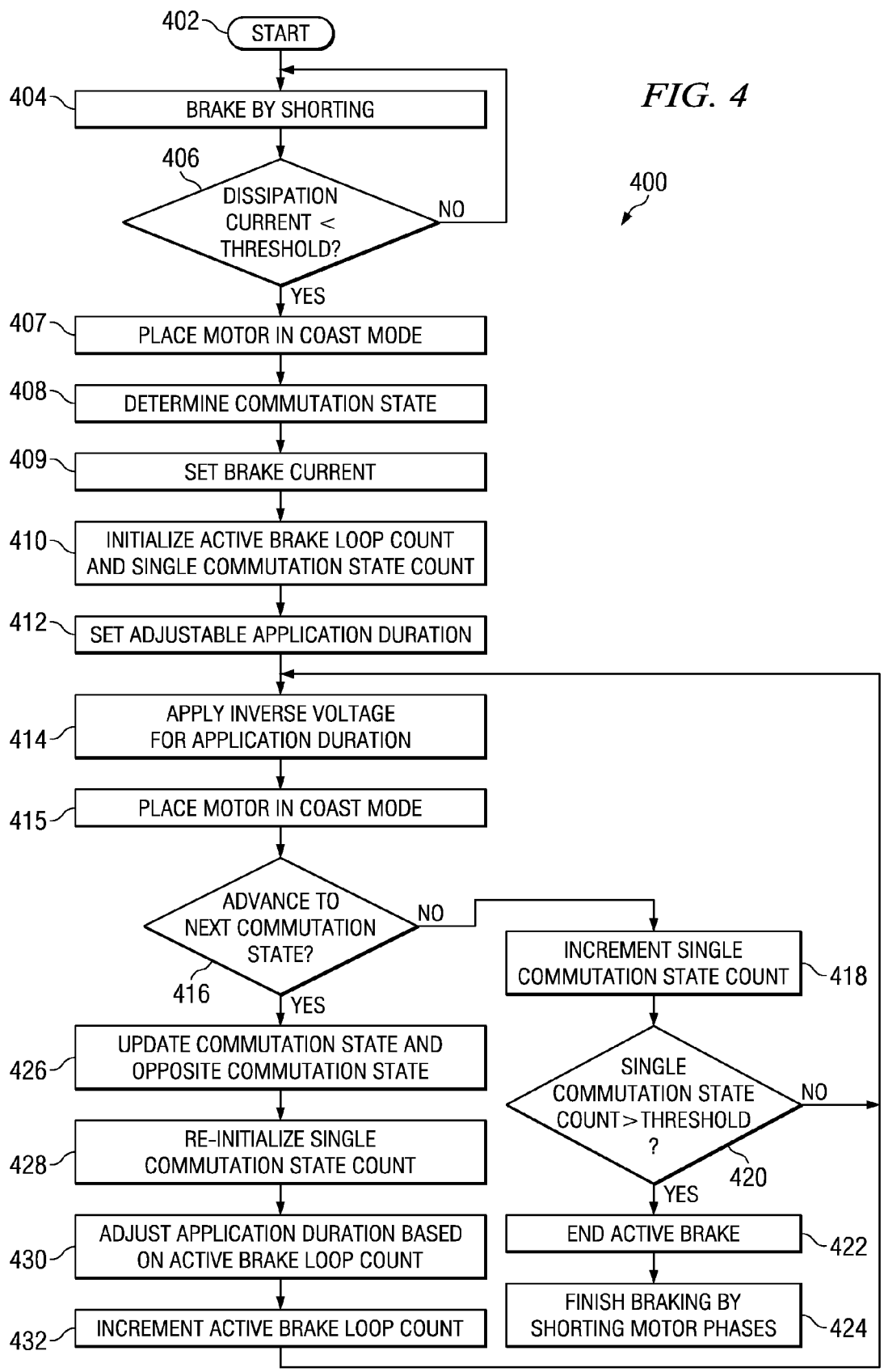
FIG. 4 is a flowchart representative of example process that may be carried out to implement the example motor control system and the example motor of FIG. 2.

FIG. 4 is a flowchart representative of example process which may be implemented using machine readable instructions that may be executed to implement the example motor control system 116 and the example motor 114 of FIG. 2. The example process of FIG. 4 may be executed by a processor, a controller, and/or any other suitable processing device and/or logic. For example, the example machine readable instructions of FIG. 4 may be embodied in coded instructions stored on a tangible medium such as a flash memory, or random access memory (RAM) (e.g., the RAM 615 shown in the example processor platform 600 and discussed below in connection with FIG. 6) associated with a processor (e.g., the processor platform 600 of FIG. 6). Alternatively, some or all of the example flowchart of FIG. 4 may be implemented using an application specific integrated circuit (ASIC), a programmable logic device (PLD), a field programmable logic device (FPLD), discrete logic, hardware, firmware, etc. In addition, some or all of the example flowchart of FIG. 4 may be implemented manually or as a combination of any of the foregoing techniques (e.g., any combination of firmware, software, hardware, and/or discrete logic). Although the process of FIG. 4 are described with reference to the example flowcharts of FIG. 4, other methods of implementing the example motor control system 116, the example motor 114, and/or, more generally, the example HDD 100 of FIG. 1, including the example controller 208, the example memory 210, the example state machine 212, the example power controller 214, the example gate drive 216, the example FETs 218-228, the example power source 230, the example detector 232, and/or the example sensors 234, may be employed. For example, the order of execution of the blocks may be changed, and/or some of the blocks described may be changed, eliminated, sub-divided, and/or combined. Additionally, the example machine readable instructions of FIG. 4 may be carried out sequentially and/or carried out in parallel by, for example, separate processing threads, processors, devices, circuits, etc.

Specifically, the flowchart of FIG. 4 represents an active brake process 400 to stop the rotation of the motor 114. Generally, the active brake process 400 includes an application of a voltage (having an inverse polarity relative to the voltage applied to run the motor 114) from the power source 230 of FIG. 2 to the motor 114 to boost a dissipation current driven by a BEMF generated by the rotation of the motor 114. Further, as described in greater detail below, the motor 114 is intermittently placed in a coast mode during the active brake process 400.

The active brake process 400 begins when the HDD 100 receives a signal to stop the rotation of the spinning motor 114 (block 402). An example signal to begin the active brake process 400 is generated by a personal computer in which the HDD 100 is implemented. The example signal is generated in response to a determination by the personal computer that the HDD 100 is not currently needed. The motor control system 116 then causes the motor 114 to enter a traditional brake mode in which the three phases of the motor 114 are shorted together (block 404). Specifically, in the illustrated example of FIG. 2, the gate drive 216 receives one or more signals from the controller 208 to cause the high-side FETs 218, 222, and 226 to be off to block current from reaching the windings 202a-c and the low-side FETs 220, 224, and 228 to be on to drain the BEMF of the motor 114.

As described above, at this point, the BEMF generated by the prior rotation of the motor 114 causes a dissipation current to flow (e.g., in the direction indicated by the arrow in FIG. 3B). As the motor 114 begins to decelerate during the traditional brake mode, the dissipation current decreases. Correspondingly, the conversion of kinetic energy to heat decreases. Because the BEMF is greatest at the onset of the traditional brake mode, the dissipation current at the onset of the coast mode is at a peak value. At this time, the dissipation current would not be significantly aided by an inverse voltage and, thus, the example active brake process 400 does not initially apply an inverse voltage as described above. In other words, the active brake process 400 waits until the dissipation current is low enough to benefit from the application of the inverse voltage.

To gauge when the inverse voltage application is to activate, the detector 232 and/or the controller 208 determines when the dissipation current decreases beyond a predetermined threshold (block 406). In the illustrated example, the detector 232 of FIG. 2 determines the rotations per minute (RPM) of the motor 114 and conveys a reading to the controller 208 to be compared with the predetermined threshold. For example, the detector may detect when the annular speed of the motor 114 decreases beyond two thousand or three thousand RPM. Alternatively, the detector 232 may take BEMF readings from the motor 114 and convey them to the controller 208 where the BEMF readings can be analyzed and/or interpreted to calculate the dissipation current, the RPM of the motor 114, and/or any other value that can be used to determine when the inverse voltage application should be activated.

When the dissipation current decreases beyond the predetermined threshold, the active brake process 400 places the motor in a coast mode (block 407) and undergoes one or more initialization procedures. In the illustrated example, the detector 232 determines a commutation state of the motor 114 via one or more of the readings described above and conveys the detected commutation state to the controller 208 (block 408). Alternatively, the state machine 212 may be accessed by the controller 208 to determine a current commutation state of the motor 114. Further, although not shown in the example process 400 of FIG. 4, the controller 208 may use the detected commutation state to determine an opposite commutation state (e.g., a state in which current flows opposite to the current flow of the current commutation state) and may store that value to, for example, determine when the active brake process 400 should be terminated. Next, the active brake process 400 sets a brake current level, which may depend on any type of characteristic of the motor 114, the controller 208, and/or any other component of the example HDD 100. Specifically, in the illustrated example, the average level of the current flowing through the motor 114 at different stages during the active brake process 400 (e.g., during the application of the inverse voltage described herein) is set and controlled by adjusting an amplitude and/or width of the current pulses driven by, for example, the power source 230.

Then, one or more variables are set to control one or more parameters of the active brake operation. In the illustrated example of FIG. 4, an active brake loop count and a single commutation state count are initially set to zero (block 410). Further, an application duration (e.g., 250-1000 microseconds) is set (block 412). As described below, the application duration is adjustable and determines how long the inverse voltage is applied to the motor 114 in one or more commutation states. To meet timing requirements and/or acoustic performance expectations, the application duration is set according to certain parameters of the HDD 100 including, for example, the type of motor being used, the number of platters, the mass of the platters, the magnitude of the power supply voltage, acoustic characteristics, velocity of rotation, inertia of the platters, the number of poles, etc. Further, the magnitude of the inverse voltage may be set according to any of the example parameters listed herein and may be adjusted by, for example, varying settings of a DAC, or any other suitable method. In some examples, the active brake operation may loop and the application duration refers to the duration of a single iteration. Other example processes may include additional or alternative variable(s), initialization(s), etc.

After the above values have been set (e.g., initialized), the motor 114 is taken out of the coast mode and the power controller 214 of FIG. 2 causes the power source 230 to apply the inverse voltage to the windings 202a-c of the motor 114 in phase with the BEMF for the application duration (block 414). As described above, the inverse voltage boosts the dissipation current and, thus, increases the rate of the conversion of kinetic energy to heat. The active brake process 400 then determines whether the application of the inverse voltage should terminate. Without proper termination of the inverse voltage application, the motor 114 may begin to rotate in a reverse direction after all of the kinetic energy is drained, which would be problematic.

In the illustrated example, the motor is placed in the coast mode (block 415) and the detector 232 acts in conjunction with the state machine 212 to determine whether to advance to the next commutation state (block 416). If not, the single commutation state count is incremented to reflect an iteration of the inverse voltage being applied for the application duration (block 418). Next, the controller 208 determines whether the current commutation state count has exceeded a predetermined threshold (block 420). The predetermined threshold is set at a value such that, if exceeded, the inverse voltage application should terminate. In other words, the motor 114 being in a single commutation state for too many iterations indicates that the inverse voltage application should terminate to avoid pushing the motor 114 into a reverse rotation. Accordingly, if the predetermined threshold is exceeded, the controller 208 ends the application of the inverse voltage (block 422). In some examples, this termination of the inverse voltage application may occur before the motor 114 has come to a complete stop. In particular, the single commutation threshold may be calculated and set to include a tolerance to ensure correct stoppage of the motor 114 before any reverse rotation occurs. Thus, after the inverse voltage application is terminated, the phases of the motor 114 are once again shorted (e.g., as described above in connection with block 404) (block 424) to bring the motor 114 to a complete stop and/or to keep the motor 114 idle.

Referring back to block 420, if the predetermined single commutation state threshold is not exceeded, the controller 208 causes the power source 230 to apply the inverse voltage for the application duration (e.g., another iteration) (block 414). Once again, the detector 232 acts in conjunction with the state machine 212 to determine whether to advance to the next commutation state (block 416). If the motor is to advance to the next commutation state, the current commutation state (as determined at block 408) is updated in the controller 208 to reflect the advancement of the motor 114 to the next commutation state. The opposite commutation described above may also be updated (block 426). Further, the controller 208 re-initializes the single commutation state count (e.g., sets the count back to zero) because the motor 114 has entered another commutation state (block 428).

In the illustrated example, the controller 208 then makes an adjustment (if necessary) to the application duration based on the active brake loop count (block 430). In other words, the number of iterations of the inverse voltage application to the motor 114 determines whether the application duration should be increased or decreased such that the power source 230 increases the dissipation current flowing through motor 114 for longer or shorter pulses. In some examples, the more iterations that occur increases the application duration so that the duty cycle (or efficiency) of the active brake process 400 is maintained at a high level. At a low speed, it takes longer for the motor to advance to the next commutation state and, thus, the application duration could be extended. After the adjustment, the controller 208 increments the active brake loop count to reflect the last iteration (block 432).

Figure 5A:
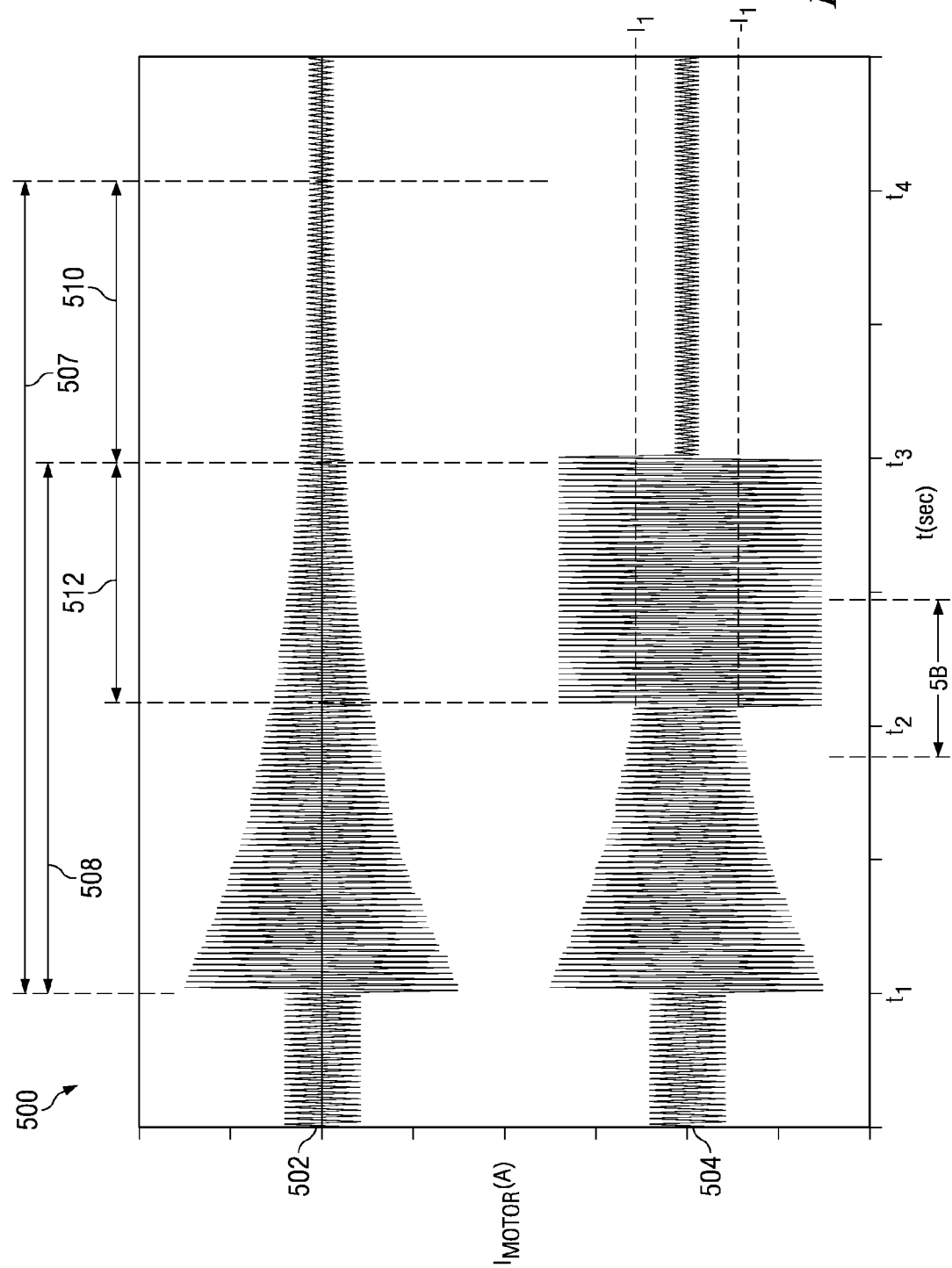
FIGS. 5A and 5B are graphs of an example plot including a first current signal associated with a conventional spindle motor and a second current signal associated with the example motor under control of the example motor controller of FIG. 2.

FIG. 5A is a graph 500 of an example plot of a first current signal 502 and a second current signal 504. The first current signal 502 represents the current flowing through a three-phase spindle motor (referred to herein as the conventional motor) throughout a conventional braking operation. The second current signal 504 represents the current flowing through the example motor 114 of FIG. 1 throughout the example active brake process 400 of FIG. 4. The graph 500 shows the first and second currents ($I_{MOTOR}$) in relation to time (t). For purposes of clarity, the graph 500 includes the currents of one phase of the motors.

At time $t_1$, the conventional motor and the motor 114 receive a signal to end their rotations. The windings of both motors are shorted together and, in response, the BEMF of each motor begins to drive the first and second currents 502 and 504 shown in FIG. 5A. As described above, these dissipation currents are at their peak value at the moment the windings are shorted because the BEMF is at its peak value.

From time $t_1$ to time $t_2$, the conventional motor and the motor 114 of FIG. 1 operate in a substantially similar manner. However, at time $t_2$, the motor control system 116 that controls the motor 114 of FIG. 1 determines that the dissipation current has reached a threshold value, which is illustrated in the graph 500 of FIG. 5A as $I_1$. As described above, the threshold current $I_1$ is a current that can by boosted by the power source 230, thereby increasing the rate of the energy conversion. For reference, time $t_2$ corresponds with block 414 of the example process 400 of FIG. 4 where the power source 230 applies an inverse voltage to the motor 114. Accordingly, the second current signal 504 expands at time $t_2$, showing the increase in the dissipation current. In contrast, the progression of the first current signal 502 does not change at time $t_2$ and rate of energy conversion continues to decrease along with the decrease in dissipation current (e.g., as shown by Equations 1-3 above).

Figure 5B:
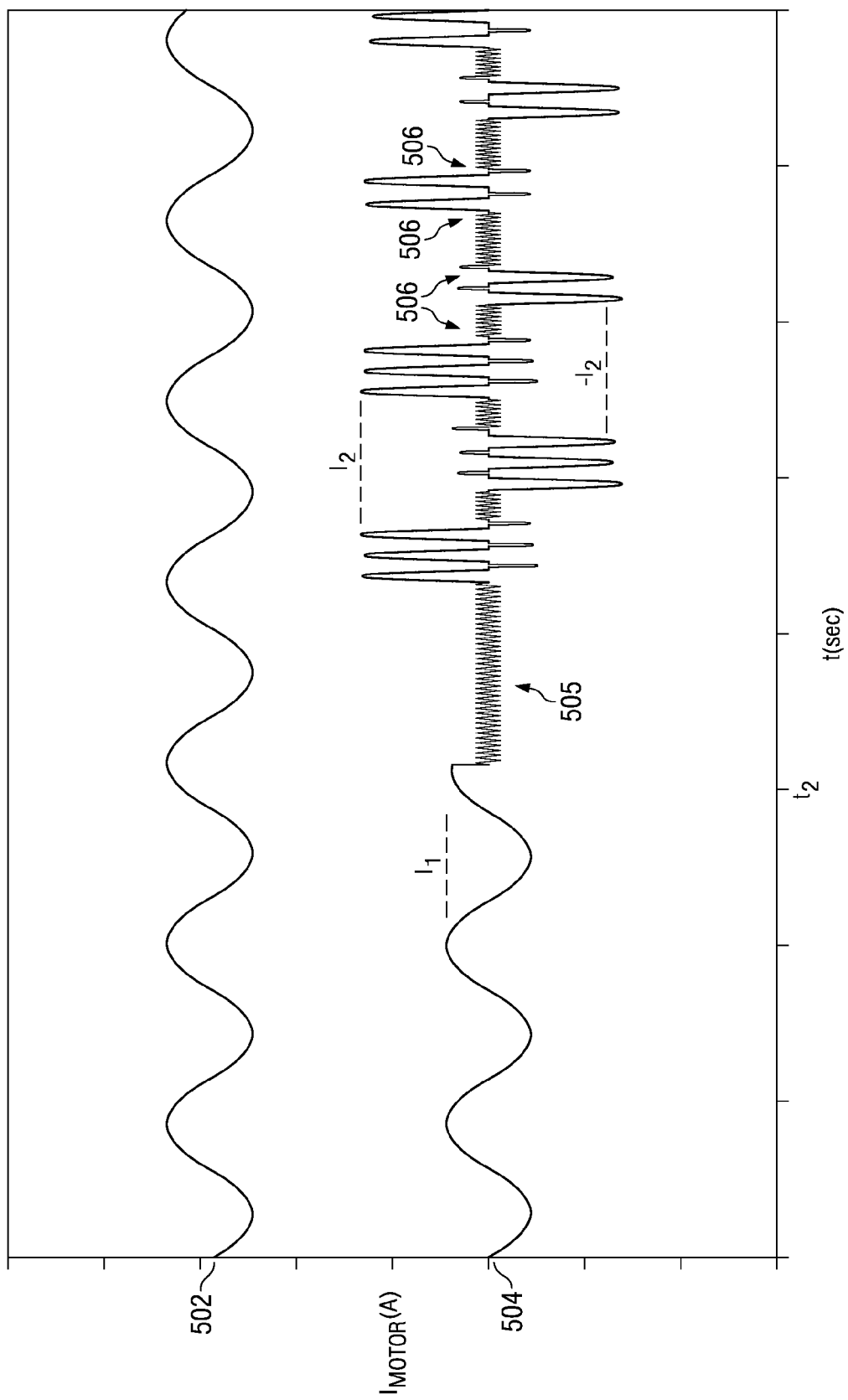

FIG. 5B shows the first current signal 502 and the second current signal 504 at a higher resolution between a time slightly before time $t_2$ and a time slightly after time $t_2$ (as indicated in FIG. 5A). As shown in FIG. 5B, the active brake process undergoes a transition period 505 before the inverse voltage is applied. FIG. 5B also shows the second current signal 504 undergoing commutation state advances 506. As described above, the commutation state advances 506 are detected by, for example, the detector 232 and the sensors 234 thereof. The amplitude of the pulses (e.g., that are driven by the application of the inverse voltage) may depend on and be set according to any characteristics. In the illustrated example, the amplitude of the pulses is shown by $I_2$. However, other examples may implement smaller or higher amplitudes. Further, the width of the pulses, which correspond to the application duration described above may be adjustable according to any suitable characteristic of the motor.

Referring back to FIG. 5A, at time $t_3$, the motor control system 116 of FIG. 1 determines that the motor 114 is substantially close to a complete stop or has come to a complete stop. Thus, as described above, the power source 230 no longer applies the inverse voltage to the motor 114. For reference, time $t_3$ corresponds to block 422 of the example active brake process 400 of FIG. 4. Accordingly, the second current signal 504 shows that the motor 114 has come to a complete stop at time $t_3$. In contrast, at time $t_3$ the first current signal 502 has not stabilized and continues to decrease. In other words, the conventional motor associated with the first current signal 502 has not stopped at time $t_3$ and the example motor 114 of FIG. 1 has come to a complete stop at time $t_3$. In particular, the conventional motor associated with the first current signal 502 continues to spin until time $t_4$.

As shown in the graph 500 of FIG. 5A, the period of time 507 required to stop the conventional motor associated with the first current signal 502 is longer than the time period 508 required to stop the example motor 114 of FIG. 1. More specifically, the conventional motor continues to spin for a time period denoted with reference numeral 510 in FIG. 5A beyond the time ($t_3$) at which the example motor 114 comes to a stop. To achieve this shorter stopping duration, as described above, the example motor 114 and motor control system 116 of FIG. 1 cause an inverse voltage to be applied to the motor 114 for a time period denoted by reference numeral 512 in FIG. 5A.

Figure 6:
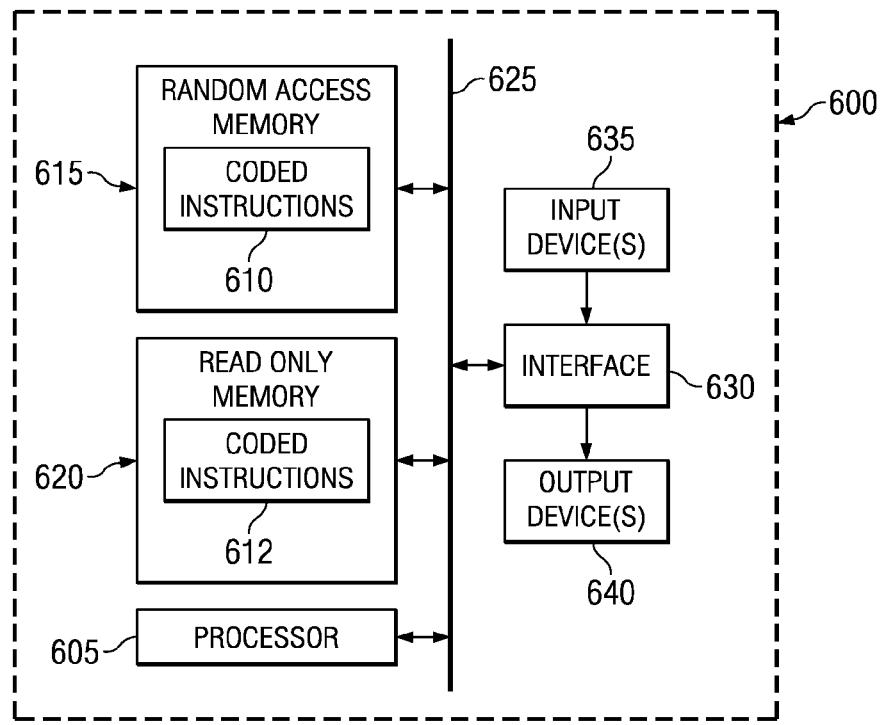
FIG. 6 is a block diagram of an example processor platform capable of executing the machine readable instructions to implement the example processes, apparatus and/or methods disclosed herein.

FIG. 6 is a schematic diagram of an example processor platform 600 that may be used and/or programmed to implement any portion(s) and/or all of the example motor control system 116 of FIG. 2 and/or, more generally, the example HDD 100 of FIG. 1. For example, the processor platform 600 can be implemented by one or more processors, processor cores, microcontrollers, digital signal processors (DSPs), DSP cores, ARM processors, ARM cores, etc.

The processor platform 600 of the example of FIG. 6 includes at least one programmable processor 605. The processor 605 executes coded instructions 610 and/or 612 present in main memory of the processor 605 (e.g., within a RAM 615 and/or a ROM 620). The processor 605 may be any type of processing unit, such as a processor core, a processor and/or a microcontroller. The processor 605 may execute, among other things, the example machine accessible instructions of FIG. 4 to implement any or all of the example motor control system 116 and/or, more generally, the example HDD 100 of FIG. 1 described herein. The processor 605 is in communication with the main memory (including a ROM 620 and/or the RAM 615) via a bus 625. The RAM 615 may be implemented by DRAM, SDRAM, and/or any other type of RAM device, and ROM may be implemented by flash memory and/or any other desired type of memory device. Access to the memory 615 and 620 may be controlled by a memory controller (not shown).

The processor platform 600 also includes an interface circuit 630. The interface circuit 630 may be implemented by any type of interface standard, such as a USB interface, a Bluetooth interface, an external memory interface, serial port, general purpose input/output, etc. One or more input devices 635 and one or more output devices 640 are connected to the interface circuit 630.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A motor control system associated with a spindle motor, comprising:
a power source operatively coupled to one or more windings of the spindle motor to drive a rotation of the spindle motor;
a detector having one or more sensors to detect a status of the spindle motor by measuring a motor inductance, wherein the status includes a level of dissipation current flowing through the spindle motor; and
a controller coupled to the power source,
wherein the controller causes the power source to apply a voltage to the spindle motor for a duration in response to the level of dissipation current dropping below a threshold, and wherein the voltage increases the dissipation current and actively stops the spindle motor, the voltage having a first polarity different than a second polarity of a back electromotive force of the spindle motor.

2. A motor control system as defined in claim 1, wherein the detector receives current signals from the one or more windings of the motor.

3. A method as defined in claim 1, wherein the detector includes one or more sense resistors to provide information to the controller regarding the status of the motor.

4. A method as defined in claim 1, wherein the controller further causes a plurality of switches to restrict the voltage from being applied to the motor.

5. A method as defined in claim 4, further comprising a driver to control an operation of the plurality of switches.

6. A method as defined in claim 1, wherein the voltage has a polarity similar to a back electromagnetic force generated by the rotation of the motor.

7. A method as defined in claim 1, wherein the dissipation current is dissipated over a resistance of the motor.

8. A method as defined in claim 1, wherein an average level of the dissipation current is controlled by adjusting an amplitude of the voltage.

9. A method as defined in claim 1, wherein an average level of the dissipation current is controlled by adjusting the duration.

10. A method for actively breaking a spindle motor, the method comprising the steps of:
coupling a power source to one of more windings of the spindle motor for driving rotation of the spindle motor;
detecting a status of the spindle motor by measuring a motor inductance, wherein the status includes a level of dissipation current flowing through the spindle motor;
coupling a controller to the power source; and
causing the power source to apply a voltage to the spindle motor for a duration in response to the level of dissipation current dropping below a threshold, and wherein the voltage increases the dissipation current and actively stops the spindle motor, the voltage having a first polarity different than a second polarity of a back electromotive force of the spindle motor.

11. A method as defined in claim 10, wherein the voltage has a polarity similar to a back electromagnetic force generated by a forward rotation of the motor.

12. A method as defined in claim 10, further comprising removing the voltage from the motor when the motor comes to a stop.

13. A method as defined in claim 10, further comprising removing the voltage from the motor when the motor reaches a predetermined rotational velocity.

14. A method as defined in claim 10, wherein the predetermined rotational velocity is set to include a tolerance factor to avoid a reverse rotation of the motor.

15. A method as defined in claim 10, further comprising adjusting the duration according to a progression of the motor to a next commutation state.

16. A method as defined in claim 10, further comprising detecting whether the motor is in a commutation state for a time period exceeding a threshold.

17. A method as defined in claim 16, further comprising removing the voltage from the motor in response to detecting the motor being in the commutation state beyond the threshold.

18. A method as defined in claim 10, further comprising shorting each phase of the motor to ground after the duration.

* * * * *